No. 866,617. PATENTED SEPT. 24, 1907.
W. BOLLWAHN.
VEHICLE POLE ATTACHMENT.
APPLICATION FILED JUNE 5, 1907.
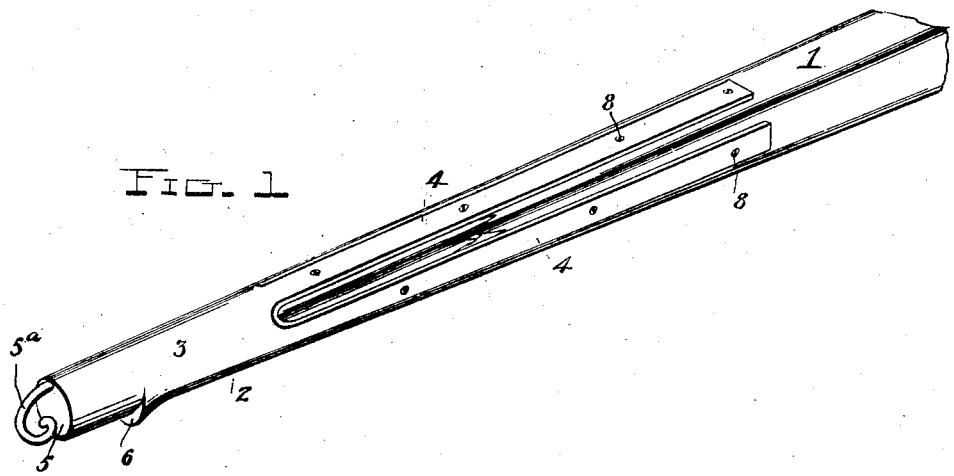
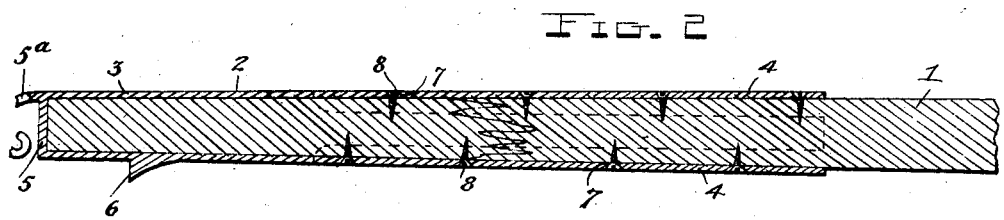
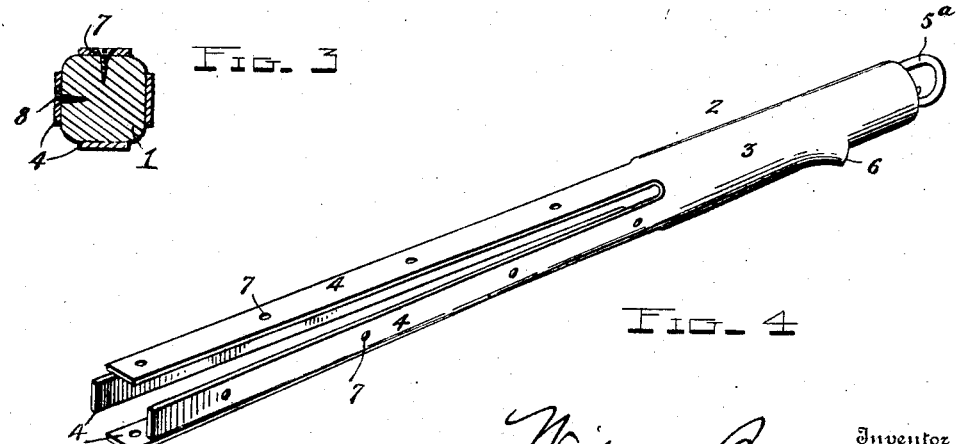
Witnesses
D. L. Nash.
H. B. Campbell
Inventor
William Bollwahn
By Watson E. Coleman
Attorney

UNITED STATES PATENT OFFICE.

WILLIAM BOLLWAHN, OF SHARON, WISCONSIN.

VEHICLE-POLE ATTACHMENT.

No. 866,617.     Specification of Letters Patent.     Patented Sept. 24, 1907.

Application filed June 5, 1907. Serial No. 377 399.

*To all whom it may concern:*

Be it known that I, WILLIAM BOLLWAHN, a citizen of the United States, residing at Sharon, in the county of Walworth and State of Wisconsin, have invented certain new and useful Improvements in Vehicle-Pole Attachments, of which the following is a specification, reference being had therein to the accompanying drawings.

My invention relates to devices for repairing broken vehicle poles, tongues, shafts and the like, and it consists of the novel construction and combination of parts hereinafter described and claimed.

The object of the invention is to provide a simple, inexpensive and practical device which may be readily applied to a broken vehicle pole or the like for the purpose of temporarily repairing the same or for repairing the same in a permanent and substantial manner so as to save the owner the expense of a new pole.

The above and other objects which will appear as the nature of the invention is better understood, are attained in the preferred embodiment of the invention illustrated in the accompanying drawings, in which Figure 1 is a perspective view showing the device applied to a split or broken vehicle pole; Figs. 2 and 3 are longitudinal and transverse sectional views through the same; and Fig. 4 is a perspective view of the device removed from the pole.

In the drawings, 1 denotes a portion of a vehicle pole and 2 my improved coupling or repair device. The latter comprises a tubular body 3 from one end of which projects a plurality of attaching and reinforcing arms or straps 4. The body 3 may be of any size and shape so as to telescope a pole, draft tongue, shaft or the like, and its outer end may be open or closed, as shown at 5. It is also preferably, but not necessarily, formed with a laterally projecting lug 6 to serve as a stop for the neck yoke when it is applied to a vehicle pole. If desired, I may also form upon the end 5 of the device a loop, eye or hook 5ª which is necessary for the attachment of the harness when the device is used upon the tongue or pole of a heavy wagon. The straps or arms 4 are preferably formed integral with the body 3 and any number may be provided, but I prefer to employ four, as shown in the drawings. They are comparatively long and resilient so that they will tightly engage the outer faces of the pole to which they are applied and they are also preferably apertured as at 7, to receive screws 8 or other fastenings which enter the pole and securely retain the device upon it. The straps 4 are, of course, of sufficient length to extend a considerable distance in rear of the split or break in the pole so that when the device is applied to it, as shown in the drawings, it will be strengthened and reinforced and rendered almost as strong as if it were without the split or break.

The device is especially designed for repairing a broken pole in a permanent and substantial manner so as to save the owner the expense of a new one, and it can be made in different sizes and shapes so as to fit poles and shafts of various kinds. The device may be also used for temporarily repairing a broken pole or shaft while on the road, since it may be conveniently carried in the vehicle and may be quickly slipped upon and secured to the broken pole or shaft.

Having thus described my invention what I claim and desire to secure by Letters Patent is:

1. A device for repairing a broken vehicle pole or the like, comprising a tubular body and a plurality of long straps or arms projecting from one end of said body and adapted to extend over and to be attached to the broken parts of the pole to reinforce and unite the same, substantially as described.

2. A device for repairing a broken vehicle pole or the like, comprising a tubular body and a plurality of resilient reinforcing and attaching arms or straps formed integral with and projecting longitudinally from one end of said body, said arms or straps being long whereby they may be engaged with and attached to the broken parts of the pole to reinforce and unite the same, substantially as described.

3. A device for repairing a broken vehicle pole or the like, comprising a tubular body and a plurality of long straps or arms projecting from one end of said body and formed with apertures to receive fastenings whereby said straps or arms may be attached to the broken parts of the pole to unite and reinforce the same, substantially as described.

4. A device for repairing a broken vehicle pole or the like, comprising a tubular body having one end closed, a plurality of integrally formed resilient straps or arms projecting from the open end of the body, said straps or arms being formed with apertures to receive fastenings and being long whereby they may be engaged with and attached to the broken parts of the pole to unite and reinforce the same, a laterally projecting stop lug formed upon the body adjacent to its closed end and an eye or loop formed upon the closed end of the body, substantially as shown and described.

In testimony whereof I hereunto affix my signature in presence of two witnesses.

WILLIAM BOLLWAHN.

Witnesses:
 GEORGE C. MANSFIELD,
 HERM. A. STEEGE.